April 5, 1960 J. K. FRANZREB 2,931,618
SHIELDED VALVE
Filed June 29, 1959
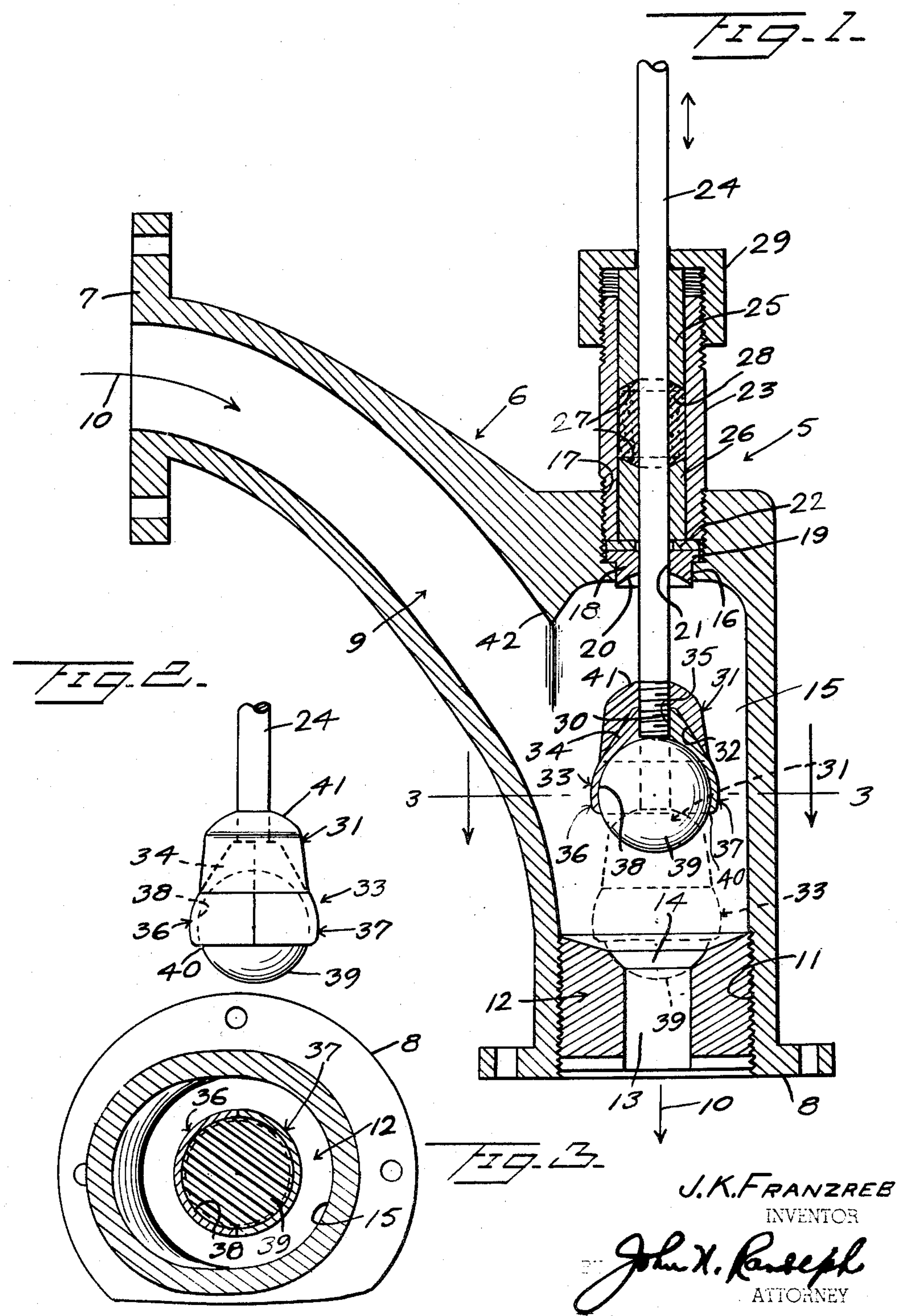
J. K. FRANZREB
INVENTOR
BY John H. Randolph
ATTORNEY United States Patent Office 2,931,618

Patented Apr. 5, 1960

2,931,618

SHIELDED VALVE

John K. Franzreb, Kingston, Tenn.

Application June 29, 1959, Serial No. 823,610

2 Claims. (Cl. 251—88)

This invention relates to a novel construction of valve especially adapted for use in controlling the flow of fluids, such as liquids or gases, containing abrasive or corrosive substances, and has for a primary object to provide a valve the parts of which will be protected from damage due to corrosion or abrasion, and wherein the parts most subject to such damage are readily replaceable.

Another object of the invention is to provide a valve wherein the movable valve element which engages the valve seat is shielded and thus protected from the flow through valve casing when in a fully or partially open position.

A further object of the invention is to provide a valve wherein the movable valve element in a fully open position functions as a seal to protect the parts through which the valve stem moves.

A further object of the invention is to provide a valve including novel means for loosely supporting the movable valve element thereof whereby said element may turn in its support so as to present different surfaces for engagement with a valve seat.

Various other objects and advantages of the invention will hereinafter become more fully apparent from the following description of the drawing, illustrating a presently preferred embodiment thereof, and wherein:

Figure 1 is a substantially central sectional view, partly in elevation, of the valve;

Figure 2 is an elevational view of a part of the valve including a movable valve element, and Figure 3 is a fragmentary transverse sectional view through the valve, taken substantially along a plane as indicated by the line 3—3 of Figure 1.

Referring more specifically to the drawing, the shielded valve in its entirety is designated generally 5 and includes a conduit section 6 constituting the valve casing or body and which has a flanged inlet end 7 and a flanged outlet end 8, which ends are disposed at an angle to one another. The valve body or conduit section 6 is adapted to be interposed in a conduit or flow line of a fluid such as a liquid or gas so that the flow through the bore 9 thereof will be in the direction as indicated by the arrows 10 from the inlet end 7 toward the outlet end 8. The outlet end 8 is internally threaded as seen at 11 to receive a removable and replaceable insert 12 which is threadedly mounted therein and which has a bore 13 extending from end-to-end therethrough. The insert 12 forms a flow restrictor and the upper end of the bore 13 thereof is enlarged to provide a valve seat 14.

The bore or passage 9 of the valve casing 6 has an enlarged portion 15 disposed above and in alignment with the insert 12. The wall of the valve casing 6 has an opening including a restricted inner end 16 which opens into the upper end of the bore portion 15 and an enlarged internally threaded outer end 17 which opens outwardly of the casing 6. Said opening or bore 16, 17 is disposed in alignment with the bore 13 and seat 14.

A bushing 18 fits snugly but detachably in the opening 16 and has a flared upper end or head 19 which fits in the lower end of the enlarged bore portion 17 for supporting the bushing 18 in the opening 16. The inner end of the bushing 18 projects slightly into the bore portion 15 and is recessed to provide a seat 20 around the inner end of the central bore 21 thereof. A washer 22 fits loosely in the bore portion 17 and rests upon the head 19.

One end of a pipe nipple 23 is threaded into the bore portion 17 against the washer 22. A valve stem 24 extends slidably through the bushing bore 21 and loosely through the washer 22 and pipe nipple 23. The pipe nipple 23 contains sleeves 25 and 26 through which the stem 24 slidably extends and which have spaced internally beveled adjacent ends 27 between which a conventional packing 28 is contained within the nipple 23 and around a part of the stem 24. Said packing 28 may be graphite rope packing or other conventional packing. A cap nut 29 fits turnably around a part of the stem 24 and threadedly engages the outer or upper end of the pipe nipple 23. The nut 29 bears against the outer end of the upper sleeve or stem guide 25 for maintaining a desired pressure thereon and on the packing 28.

The lower end of the stem 24, which is disposed in the bore portion 15, is threaded as seen at 30 to receive a nut 31 having a downwardly opening cavity 32 of considerable depth which is flared toward its open lower end.

A shield 33 has an upper portion 34 of a proper exterior size and shape to fit snugly in the cavity 32. Said upper portion 34 has an upwardly opening threaded socket 35 in which the distal part of the threaded stem end threadedly fits. The threaded portion 30 is of a length to snugly seat in the threaded socket 35 when the nut 31 is in threaded engagement with the inner part of the threaded portion 30 and when the shield part 34 is seated in the cavity 32, as seen in Figure 1, so that the two corresponding halves 36 and 37 of which the shield 33 is composed will be secured together and to the stem 24 by the nut 31 and threaded stem portion 30.

The two assembled halves 36 and 37 of the shield 33 additionally combine to form a downwardly opening socket 38 constituting more than a hemisphere for receiving a major portion of a spherical valve element 39 which is supported by the socket 38 with less than a half of the sphere 39 protruding from the open bottom 40 of said socket 38, and which is smaller in diameter than a part of the socket 38 disposed above the opening 40. The spherical valve element 39 has a diameter slightly less than the internal diameter of the socket 38 to provide a loose fitting engagement in said socket, so that the ball valve 39, while supported by the socket 38, may turn therein.

Any suitable and conventional means may be provided to effect reciprocating movement of the valve stem 24 and which may or may not additionally include a rotary movement of said valve stem. The exposed lower part of the ball valve 39 is of a proper size to correctly engage and seal the valve seat 14 when the stem 24 is displaced downwardly. When the valve element 39 is in a closed position the pressure of the fluid in the passage 9 will tend to hold the valve colsed. In the partially open position of the valve, as shown in Figure 1, the shield 33 will effectively shield the exposed lower part of the valve element 39 from the fluid flowing through the passage 9 toward the restricted outlet 13, so that the valve element 39 will be protected from damage due to abrasive or corrosive substances or characteristics of the fluid. The upper surface 41 of the nut 31 is shaped to seat in the seat 20, when the stem 24 is in a fully raised or retracted position, to prevent any of the fluid from escaping upwardly through the bushing 18 and into contact with the stem guide 26 or 25 or the packing 28. In addition to the nut 31 and shield 33 providing a streamline surface around which the fluid medium can flow with a minimum obstruction, when the valve is in a partially open position as seen in Figure 1, when the stem 24 is fully retracted, as previously described, the valve casing 6 provides an internal lip 42 between the upper portion of the passage 9 and the upper end of the bore portion 15 for deflecting the fluid downwardly and away from the valve element 39, shield 33 and nut 31.

The stem guides 25 and 26, bushing 18, nut 31 and shield 33 may be formed of suitable materials which are resistant to corrosion and abrasion. The stem guides 25 and 26 are preferably formed of bronze or brass. The spherical valve element 39 is preferably formed of plastic and is solid, but may be formed of various other suitable materials. The replaceable insert 12 may be formed of metal which is hardened and corrosive and abrasive resistant, or may be formed of other suitable materials including plastic. It will be readily apparent that all of the parts associated with the casing 6 are readily replaceable.

Various modifications and changes are contemplated and may be resorted to, without departing from the function or scope of the invention as hereinafter defined by the appended claims.

I claim as my invention:

1. In combination with a valve stem having a threaded end, a nut threadedly engaging a part of said threaded end, a shield having an internally threaded socket opening outwardly of one end thereof, said socket threadedly engaging another distal part of said threaded end, said nut having a cavity in which an end portion of said shield, surrounding said threaded socket, conformably fits, said shield having an enlarged opposite end defining a socket opening away from said threaded socket, said shield being formed of corresponding halves held assembled on the stem by engagement of the first mentioned shield end in said nut cavity, said last mentioned socket constituting more than a hemisphere and having an open end of smaller diameter than another part of said socket, and a spherical valve element mounted in and supported by said last mentioned socket, the diameter of said valve element being greater than the diameter of the open end of the last mentioned socket.

2. In the combination as defined by claim 1, the diameter of said spherical valve element being less than the maximum internal diameter of the last mentioned socket whereby the valve element is turnably supported in the shield.

References Cited in the file of this patent

UNITED STATES PATENTS

| | | |
|---|---|---|
| 1,508,047 | Bowler | Sept. 9, 1924 |
| 1,773,110 | Meyers | Aug. 19, 1930 |

FOREIGN PATENTS

| | | |
|---|---|---|
| 28,291 | France | Oct. 28, 1924 |
| 988,899 | France | May 16, 1951 |
| 668,055 | Great Britain | Mar. 12, 1952 |